(12) United States Patent
Farhadiroushan et al.

(10) Patent No.: US 9,983,293 B2
(45) Date of Patent: May 29, 2018

(54) METHOD AND SYSTEM FOR LOCATING AN ACOUSTIC SOURCE

(75) Inventors: Mahmoud Farhadiroushan, Elstree (GB); Tom Parker, Elstree (GB); Kamil Yousif, Elstree (GB)

(73) Assignee: Silixa Ltd., Hertfordshire (GB)

( * ) Notice: Subject to any disclaimer, the term of this patent is extended or adjusted under 35 U.S.C. 154(b) by 412 days.

(21) Appl. No.: 14/124,183

(22) PCT Filed: Jun. 6, 2012

(86) PCT No.: PCT/GB2012/000490
§ 371 (c)(1),
(2), (4) Date: Dec. 5, 2013

(87) PCT Pub. No.: WO2012/168679
PCT Pub. Date: Dec. 13, 2012

(65) Prior Publication Data
US 2014/0092710 A1    Apr. 3, 2014

(30) Foreign Application Priority Data

Jun. 6, 2011    (GB) .................................. 1109372.1
Aug. 3, 2011    (GB) .................................. 1113381.6

(51) Int. Cl.
*G01S 5/20* (2006.01)
*G01H 9/00* (2006.01)
*G01V 1/18* (2006.01)

(52) U.S. Cl.
CPC ............... *G01S 5/20* (2013.01); *G01H 9/004* (2013.01); *G01V 1/186* (2013.01)

(58) Field of Classification Search
CPC ........... G01S 5/20; G01H 9/004; G01V 1/186
(Continued)

(56) References Cited

U.S. PATENT DOCUMENTS

| 3,739,871 A | 6/1973 | Bailey |
| 5,946,429 A | 8/1999 | Huang et al. |

(Continued)

FOREIGN PATENT DOCUMENTS

| GB | 2476449 A | 6/2011 |
| JP | 2010085320 A | 4/2010 |

(Continued)

OTHER PUBLICATIONS

"Improved Demodulation Scheme for Fiber Optic Interferometers Using an Asymmetric 3x3 Coupler", Z. Zhao et al., J. Lightwave Technology, vol. 13, No. 11, Nov. 1997, pp. 2059-2068 (10 pages).

(Continued)

*Primary Examiner* — James R Hulka
*Assistant Examiner* — John T Nolan
(74) *Attorney, Agent, or Firm* — Osha Liang LLP

(57) ABSTRACT

A method and a system are provided, in which acoustic signals received by distributed acoustic sensors are processed in order to determine the position of a source or sources of the acoustic signals. The method and system are able to determine the position of several acoustic sources simultaneously, by measuring the corresponding several acoustic signals. Furthermore, the strength of the acoustic signal or signals can be determined. The location of the acoustic source may be overlaid on a map of an area being monitored, or be used to generate an alarm if perceived to correspond to a threat or an intrusion, for example in a pipeline monitoring application. Alternatively, the method and systems can be used to monitor a hydraulic fracturing process.

19 Claims, 10 Drawing Sheets

(58) Field of Classification Search
USPC .......................................................... 367/118
See application file for complete search history.

(56) References Cited

U.S. PATENT DOCUMENTS

| | | | |
|---|---|---|---|
| 5,973,998 A | 10/1999 | Showen et al. | |
| 2004/0246816 A1 | 12/2004 | Ogle | |
| 2010/0200743 A1 | 8/2010 | Forster et al. | |
| 2011/0069302 A1* | 3/2011 | Hill | G01V 1/186 356/73.1 |
| 2011/0120702 A1 | 5/2011 | Craig | |
| 2012/0018149 A1* | 1/2012 | Fidan | G01V 8/16 166/250.03 |
| 2012/0024051 A1* | 2/2012 | Lopez | G01V 8/16 73/152.16 |
| 2012/0111560 A1* | 5/2012 | Hill | E21B 43/11857 166/250.1 |
| 2012/0226452 A1* | 9/2012 | Hill | G01H 9/004 702/56 |

FOREIGN PATENT DOCUMENTS

| | | | | |
|---|---|---|---|---|
| WO | 99/42857 A1 | 8/1999 | | |
| WO | 2009/113953 A1 | 9/2009 | | |
| WO | 2010/020795 A1 | 2/2010 | | |
| WO | 2010/090660 A1 | 8/2010 | | |
| WO | 2010/136764 A2 | 12/2010 | | |
| WO | 2010/136809 A2 | 12/2010 | | |
| WO | 2010/136810 A2 | 12/2010 | | |
| WO | WO 2010136764 A2 * | 12/2010 | ........ | E21B 43/11857 |
| WO | 2011/058313 A2 | 5/2011 | | |
| WO | WO 2011058313 A2 * | 5/2011 | ............. | G01H 9/004 |

OTHER PUBLICATIONS

"Multichannel analysis of surface Waves", C. B. Park et al., Geophysics, vol. 64, No. 3, May-Jun. 1999, pp. 800-808 (9 pages).
"In situ measurements of shear-wave velocity in sediments with higher-mode Rayleigh waves", P. Gabriels et al., Geophysics Prospecting 35, pp. 187-196, 1987 (10 pages).
Combined Search and Examination Report issued in corresponding British Application No. 1113381.6; dated Dec. 16, 2011 (7 pages).
"First Downhole Application of Distributed Acoustic Sensing (DAS) for Hydraulic Fracturing Monitoring and Diagnostics", M. Molenaar et al., Society of Petroleum Engineers, Jan. 2011 (9 pages).
International Search Report issued in corresponding International Application No. PCT/GB2012/000490; dated 13, 2012 (4 pages).
Written Opinion issued in corresponding International Application Na PCT/GB2012/000490; dated Sep. 13, 2012 (7 page).
Office Action in corresponding European Patent Application No. 12730006.9 dated Dec. 12, 2017 (6 pages).
From Wikipedia, the Free Encyclopedia, "Multilateration", Nov. 2010; https://web.archive.org/web/20101130172253/https://en.wikipedia (9 pages).

* cited by examiner

METHOD AND SYSTEM FOR LOCATING AN ACOUSTIC SOURCE

CROSS-REFERENCE TO RELATED APPLICATIONS

This application is a National Stage application of International Patent Application No. PCT/GB2012/000490, filed on Jun. 6, 2012, which claims priority to British Patent Application No. 1109372.1, filed on Jun. 6, 2011, and British Patent Application No. 1113381.6, filed on Aug. 3, 2011. These priority applications are hereby incorporated by reference in their entireties.

TECHNICAL FIELD

The present invention relates to the field of locating acoustic sources and provides a method and a system for locating acoustic sources in which a plurality of acoustic sensors are distributed in space and acoustic signals received at the plurality of acoustic sensors are processed in order to determine the position of the acoustic source. In a particular embodiment, the plurality of acoustic sensors is provided in a distributed optical fibre sensor.

BACKGROUND TO THE INVENTION

There are many applications in which it is desirable to determine, with accuracy, the location of an acoustic source. For example, in the fracturing of oil or gas-bearing shale by injecting water and chemicals under high pressure (hydraulic fracturing or "fracking") acoustic energy is produced and it is advantageous to know the positions at which these acoustic events take place.

Conventional sensor systems include acoustic arrays of hydrophones or geophones, commonly termed 'passive seismic' or 'micro seismic' detectors, and are typically deployed either in linear form inserted into a borehole within a few hundred meters of the point of injection of fracturing fluids, or in the form of a two dimensional grid on or just below the surface adjacent to the injection point. A limitation of this prior art is that the number of sensors that may be deployed is limited at typically less than one hundred, and their spatial locations are either constant or may only be changed by laborious and time-consuming re-deployment of the sensor array.

Another important application is in security applications such as intruder detection. It is desirable to detect breaching of a perimeter fence, sabotage or illegal tapping of oil and gas pipelines. Each of these events will result in an acoustic signal being produced which, if detected, would allow an alarm to be raised. In this case, in detecting an acoustic event knowledge of position is also desirable. However, the strength of an acoustic source is usually unknown and so the strength of a signal as detected by an acoustic sensor is not a reliable indicator of the distance between the source and the sensor and therefore of position.

It is therefore an object of at least one embodiment of the present invention to provide a method of locating an acoustic source that obviates or mitigates one or more said limitations of the prior art.

SUMMARY OF THE INVENTION

According to a first aspect of the present invention, there is provided a method of determining the location of an acoustic source, the method comprising:

providing a plurality of acoustic sensors;
receiving an acoustic signal from the acoustic source at the plurality of acoustic sensors; and
processing the received acoustic signals to determine the location of the acoustic source relative to at least one of the acoustic sensors.

The present invention provides a method for the measurement of the position of an acoustic source in the vicinity of a plurality of acoustic sensors. The skilled person will also realise that the present invention is also able to determine the position of several acoustic sources simultaneously, by measuring the several acoustic signals at the plurality of acoustic sensors.

Most preferably, providing a plurality of acoustic sensors comprises providing a distributed optical fibre sensor. A distributed optical fibre sensor acts like a string of discrete acoustic sensors, and provides several advantages including coherence between the discrete acoustic measurements. Most preferably the distributed optical fibre sensor employs an interferometer arrangement such as described in further detail below. It is also envisaged that distributed optical fibre sensors employing coherent Rayleigh noise methodologies may be utilised. It is also envisaged that a plurality of independent, synchronised, point sensors would allow realisation of the invention.

In one preferred embodiment of the invention, processing the received acoustic signals comprises determining a plurality of loci data, each loci data comprising the position of a corresponding acoustic sensor and the time of arrival of the acoustic signal at the respective acoustic sensor, and determining the location of the acoustic source by determining a fit between the loci data and a predetermined relationship between source position and loci data.

In an alternative preferred embodiment of the invention, processing the received acoustic data comprises evaluating a plurality of cost functions by cross-correlating the received acoustic signals with one or more received acoustic signals delayed according to a pre-determined relationship between source position and acoustic sensor position, and selecting a maximum cost function from the plurality.

Most preferably, processing the received acoustic signals comprises determining a delay between the acoustic signals received at two different acoustic sensors. Optionally, processing the received acoustic signals comprises determining the relative phase between the acoustic signals received at two different acoustic sensors. Preferably, a plurality of delays is determined between a corresponding plurality of pairs of acoustic sensors. Based on the known positions of the acoustic sensors, the location of the acoustic source can be determined based on the at least one determined delay.

Preferably, the method further comprises identifying the acoustic sensor that is closest to the acoustic source. Optionally the acoustic sensor closest to the acoustic source is determined by comparison of a plurality of delays.

Yet further alternatively, the method comprises correlating received acoustic signals from adjacent acoustic sensors. Preferably, the acoustic sensor closest to the acoustic source is determined by determining a minimum correlation between received acoustic signals from adjacent acoustic sensors.

Preferably, the method comprises determining a distance between the acoustic source and the acoustic sensor that is closest to the acoustic source. Alternatively, the distance is determined by comparing the delay between the acoustic signal received at the acoustic sensor that is closest to the acoustic source and the acoustic signal received at one or more other acoustic sensors. Optionally, the distance is determined by determining a first distance relating to the acoustic sensors on a first side of the acoustic sensor that is closest to the acoustic source, determining a second distance based on the acoustic sensors on a second side of the acoustic sensor that is closest to the acoustic source, and calculating a mean. The mean may be weighted.

Optionally, providing a plurality of acoustic sensors comprises arranging the acoustic sensors in one or more straight lines. Alternatively, and advantageously, providing a plurality of acoustic sensors comprises arranging the acoustic sensors in a two-dimensional geometry. For example, a circle, square, grid, triangle, serpentine line or other non-linear arrangement. Most preferably, the acoustic sensors are arranged around an event or an item to be monitored.

In one embodiment the processing that is performed comprises separating the received acoustic signals into their component frequencies and determining the location in dependence on at least one (or more) of the component frequencies and the known speed of sound for that frequency through the surrounding medium. This provides advantages that it then becomes possible to account for local dispersion characteristics in the area being monitored, without requiring extensive and laborious calibration of the system upon installation. Instead, a frequency is used the speed of sound for which is known from a priori dispersion measurements.

Within the above embodiment the processing further comprises evaluating a plurality of cost functions that relate acoustic sensor position to source position in dependence on the respective time delays experienced by component frequencies of the received acoustic signal; and determining a cost function indicative of the distance to the source position. Hence, it becomes possible to determine distance to the source taking into account local dispersion conditions across a number of frequencies, which should improve accuracy.

According to a second aspect of the present invention, there is provided a method of monitoring a hydraulic fracturing process comprising the method of the first aspect.

Optionally, the method comprises deploying a distributed optical fibre sensor in the vicinity of oil- or gas-bearing shale to be fractured by the hydraulic fracturing process.

Optionally, the method comprises injecting water and/or chemicals into the oil- or gas-bearing shale and determining the location of at least one resulting acoustic event.

Embodiments of this aspect of the invention may comprise preferred and optional features of other aspects of the invention, and vice versa.

According to a third aspect of the present invention, there is provided a surveillance method comprising the method of the first aspect. This method may be employed to monitor an asset such as an oil or gas pipeline.

Optionally, the method comprises deploying a distributed optical fibre sensor in the vicinity of an asset or location to be monitored. Optionally, the distributed optical fibre sensor is deployed on or along the asset, or around the location.

Advantageously, the method comprises burying the distributed optical fibre sensor. Alternatively, or advantageously, the distributed fibre sensor is deployed in a predetermined geometric configuration.

Optionally, the method comprises correlating the determined position of an acoustic source with one or more position related data. For example, the position of the acoustic source could be overlaid on a corresponding map of an area being monitored.

The nature of the acoustic source may be determined as a function of the duration of a corresponding acoustic event, the frequency of the acoustic signal, and/or the amplitude of the acoustic event.

Optionally, the method comprises sounding an alarm, or providing an alert, dependent on one or more measured characteristics of the acoustic signal. For example, the measured position of the acoustic source with respect to the acoustic sensor can be used to determine the spatial relationship between the source and an asset to be protected and an alarm or alert produced responsive to a determination that the spatial relationship corresponds to a threat (or perceived threat) to the asset.

Embodiments of this aspect of the invention may comprise preferred and optional features of other aspects of the invention, and vice versa.

According to a fourth aspect of the present invention, there is provided a computer readable medium comprising computer code which, when executed on a computer, causes the computer to perform the method of any preceding aspect.

The computer readable medium may be volatile or non-volatile, contained in RAM, ROM, firmware or otherwise, and the fourth aspect shall be understood to extend to transient copies of said computer code.

According to a fifth aspect of the present invention, there is provided an apparatus for locating an acoustic source, the apparatus comprising:

a plurality of acoustic sensors arranged to receive an acoustic signal from the acoustic source; and processing means configured to process the received acoustic signals to determine the location of the acoustic source relative to at least one of the acoustic sensors.

Most preferably, the plurality of acoustic sensors comprises at least one distributed optical fibre sensor. A distributed optical fibre sensor acts like a string of discrete acoustic sensors, and provides several advantages including coherence between the discrete acoustic measurements. Most preferably the distributed optical fibre sensor employs an interferometer arrangement such as described in further detail below. It is also envisaged that distributed optical fibre sensors employing coherent Rayleigh noise methodologies may be utilised. It is also envisaged that a plurality of independent, synchronised, point sensors would allow realisation of the invention.

Most preferably, the processing means is configured to determine a delay between acoustic signals received at two different acoustic sensors. Optionally, the processing means is configured to determine the relative phase between the acoustic signals received at two different acoustic sensors. Preferably, the processing means is configured to determine a plurality of delays between a corresponding plurality of pairs of acoustic sensors.

Preferably, the processing means is configured to determine the acoustic sensor that is closest to the acoustic source.

Preferably, the processing means is configured to determine a distance between the acoustic source and the acoustic sensor that is closest to the acoustic source.

Optionally, the plurality of acoustic sensors are arranged in one or more straight lines. Alternatively, and advantageously, the acoustic sensors are arranged in a two-dimensional geometry. For example, a circle, square, grid, triangle, serpentine line or other non-linear arrangement. Most preferably, the acoustic sensors are arranged around an event or an item to be monitored. A three-dimensional geometry may also be employed.

Embodiments of this aspect of the invention may comprise preferred and optional features of other aspects of the invention, and vice versa.

According to a sixth aspect of the present invention, there is provided a downhole monitoring apparatus comprising the apparatus of the fifth aspect.

Optionally, the apparatus comprises a distributed optical fibre sensor deployed in the vicinity of oil- or gas-bearing shale to be fractured by a hydraulic fracturing process.

Embodiments of this aspect of the invention may comprise preferred and optional features of other aspects of the invention, and vice versa.

According to a seventh aspect of the present invention, there is provided a surveillance apparatus comprising the apparatus of the fifth aspect. This apparatus may be employed to monitor an asset such as an oil or gas pipeline.

Optionally, the apparatus comprises a distributed optical fibre sensor deployed in the vicinity of an asset or location to be monitored. Optionally, the distributed optical fibre sensor is deployed on or along the asset, or around the location.

Advantageously, the apparatus comprises a buried distributed optical fibre sensor. Alternatively, or advantageously, the distributed fibre sensor is deployed in a predetermined geometric configuration.

Optionally, the apparatus is configured to display the position of an acoustic source overlaid on a corresponding map of an area being monitored. Optionally, the apparatus is configured to an alarm dependent on one or more measured characteristics of the acoustic signal.

Embodiments of this aspect of the invention may comprise preferred and optional features of other aspects of the invention, and vice versa.

BRIEF DESCRIPTION OF DRAWINGS

The present invention will now be described by way of example with reference to the accompanying drawings in which.

DETAILED DESCRIPTION OF PREFERRED EMBODIMENTS

Figure 1:
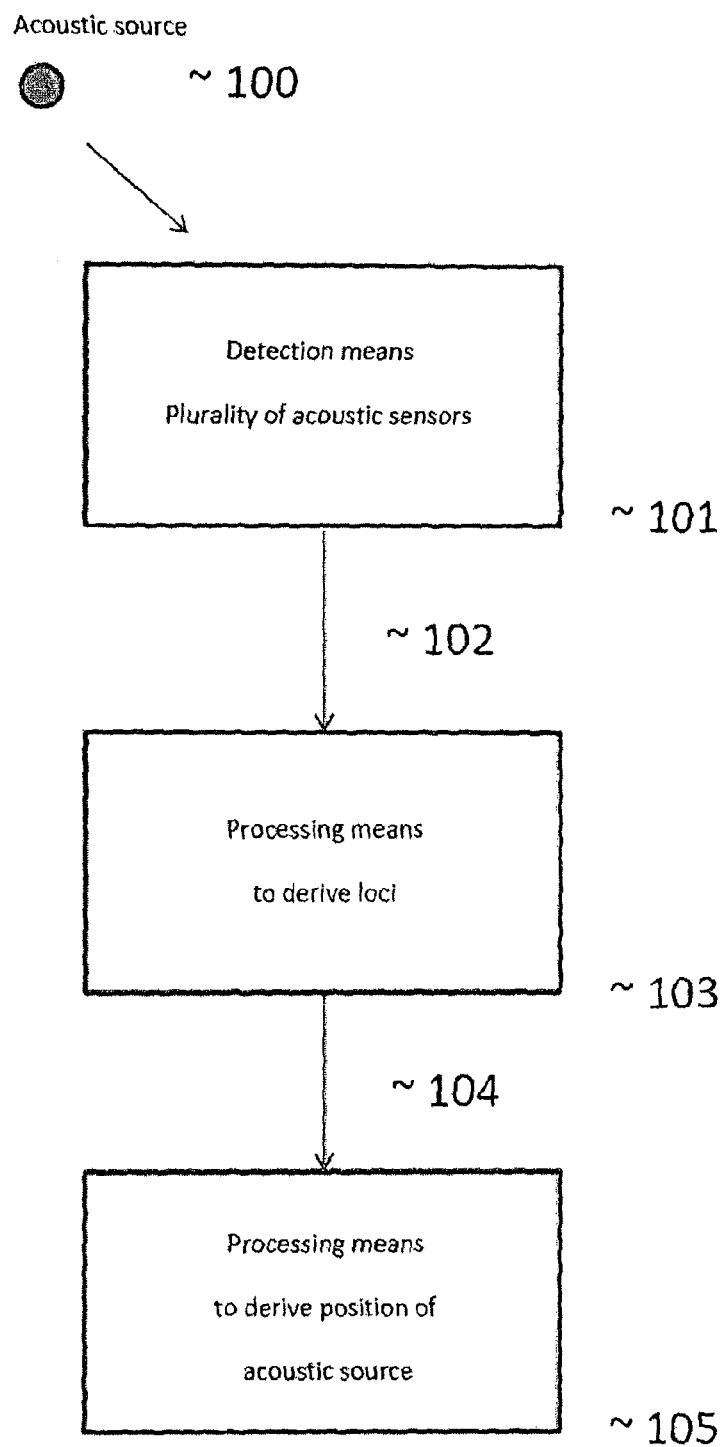
FIG. 1 is a summary of the different components of the invention.

With reference to FIG. 1, the present invention consists of one or more detection means each consisting of a plurality of acoustic sensors (101) from which one or a plurality of signals (102) as a function of space and time may be obtained which results from acoustic energy from one or a plurality of optical sources (100) falling on the detection means (101), a processing means (103) which derives one or a plurality of loci (104) from the signal (102), and a processing means (105) which derives a position for one or a plurality of acoustic sources (100) from the one or plurality of loci (104). In preferred embodiments of the invention, the plurality of acoustic sensors is high and they are closely placed, preferably implemented with a distributed acoustic sensor, and more preferably, a distributed optical fibre acoustic sensor, and still more preferably, where both the acoustic amplitude and phase are provided. An example of such preferred detection means is described in patent applications WO2010/136809A2 and WO2010/136810A2 and in further detail in relation to FIG. 1*b* below.

The time of first arrival of acoustic energy from an acoustic source (100) identified in the signal (102) may be used by the processing means (103) to obtain the required loci (104), but higher signal to noise and overall enhanced performance is realisable if a substantial duration of acoustic energy may be included in obtaining the loci (104). This requires coherence of the acoustic energy detected by the detection means (101) and this is preferably obtained by implementing the detection means (101) with an optical fibre acoustic sensor in which the detection of both acoustic amplitude and phase is achieved.

The loci (104) consist of sets of co-ordinates in time and space at which a characteristic, common to the signal detected by many of the acoustic sensors of the detector means (101), of the acoustic energy occurs in the signal (102) produced by the detector means (101). The processing means (103) may take any features of the acoustic energy detected by the detector means (101) to derive the loci (102) by cross correlation if the acoustic energy is transmitted isotropically from the acoustic sources (100) to the detection means (101) with low dispersion so that the signal detected by each acoustic sensor in the detection means (101) has substantially the same shape. However, in a preferred embodiment of the present invention the processing means (103) obtains the phase or phases of one or a plurality of substantially single acoustic frequency components of the signal detected at each acoustic sensor of the detector means (101). In this way the effects of dispersion may be reduced. A person skilled in the art of signal processing knows how to apply suitable methods, such as narrow band filtering and Fourier transforms, to obtain the phases and such details are therefore not given here.

The spatial arrangement of the acoustic sensors in the detection means (101) may take a variety of forms which may be taken into account by the processing means (105) when processing the loci (104). However, in one embodiment of the present invention, the detection means (101) is such that the plurality of acoustic sensors lie on one or a plurality of substantially straight lines in space which simplifies the processing carried out by the processing means (105).

Figure 1B:
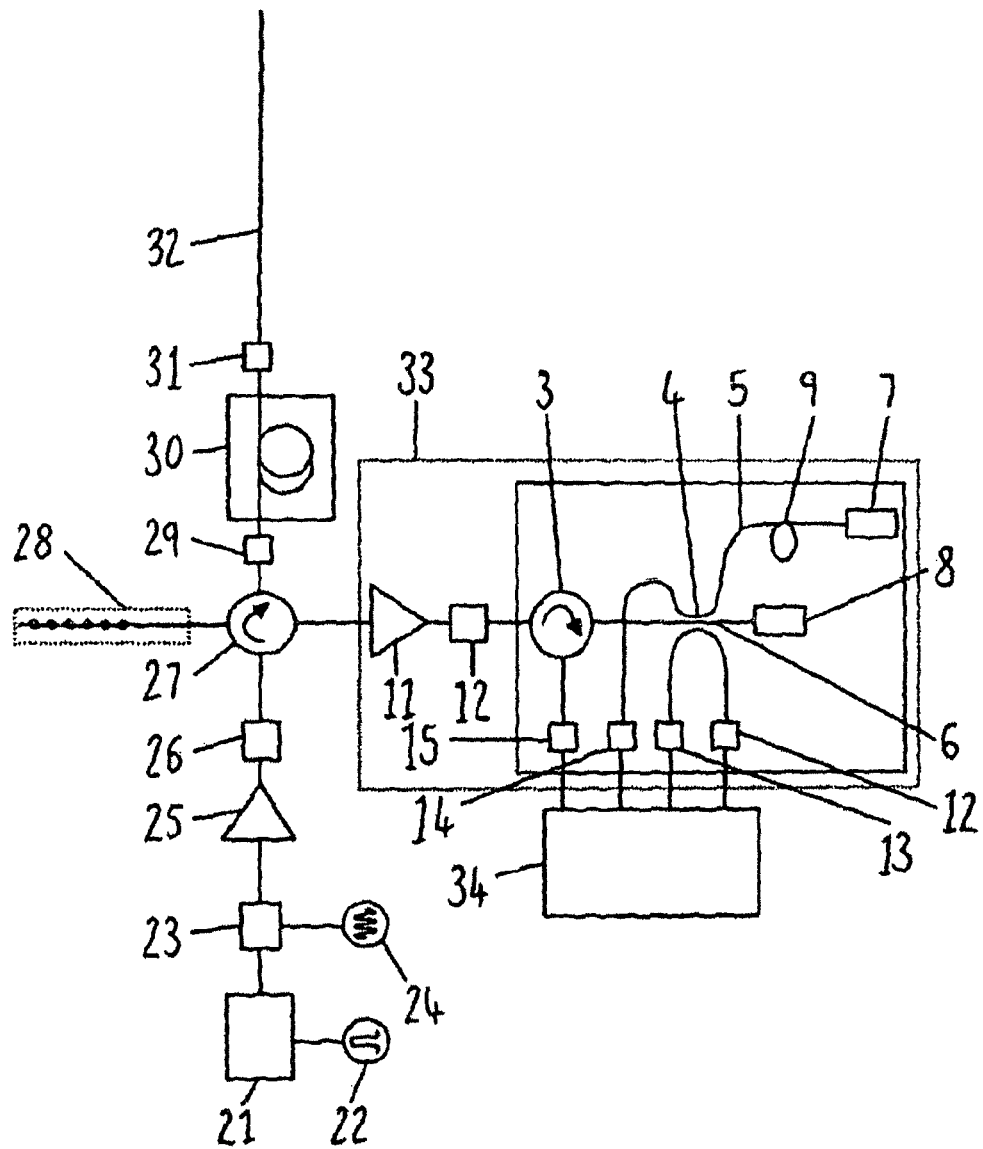
FIG. 1*b* illustrates in schematic form an interferometer for measuring the optical amplitude, phase and frequency of an optical signal from which the acoustic amplitude, phase and frequency may be derived, and which may be comprised in a detection means in accordance with an embodiment of the present invention.

In a particular embodiment of the invention, described here in order to provide an example of a preferred implementation of the present invention, and as suggested above the plurality of acoustic sensors is provided in a distributed optical fibre sensor which comprises a length of optical fibre—located in a location or environment to be monitored—coupled to an interferometer such as illustrated in FIG. 1b.

Light emitted by a laser (21) is modulated by a pulse signal (22). An optical amplifier (25) is used to boost the pulsed laser light, and this is followed by a band-pass filter (26) to filter out the ASE noise of the amplifier. The optical signal is then sent to an optical circulator (27). An additional optical filter (28) may be used at one port of the circulator (27). The light is sent to sensing fibre (32), which is for example a single mode fibre or a multimode fibre. A length of the fibre may be isolated and used as a reference section (30), for example in a "quiet" location or with a controlled reference signal. The reference section (30) may be formed between reflectors or a combination of beam splitters and reflectors (29) and (31). The reflected and the backscattered light generated along the sensing fibre (32) is directed through the circulator (27) and into the interferometer (33).

Within the interferometer, the incoming light is amplified in an optical amplifier (1), and transmitted to the optical filter (2). The filter (2) filters the out of band Amplified Spontaneous Emission noise (ASE) of the amplifier (1). The light then enters into an optical circulator (3) which is connected to a 3×3 optical coupler (4). A portion of the light is directed to the photodetector (12) to monitor the light intensity of the input light. The other portions of light are directed along first and second optical paths (5) and (6), with a path length difference between the two paths. Faraday-rotator mirrors (FRMs) (7) and (8) reflect the light back through the first and second paths (5) and (6), respectively. The Faraday rotator mirrors provide self-polarisation compensation along optical paths (5) and (6) such that the two portions of light efficiently interfere at each of the 3×3 coupler (4) ports. The optical coupler (4) introduces relative phase shifts of 0 degrees, +120 degrees and −120 degrees to the interference signal, such that first, second and third interference signal components are produced, each at a different relative phase.

First and second interference signal components are directed by the optical coupler (4) to photodetectors (13) and (14), and the third interference signal component incident on the optical circulator (3) is directed towards photodetector (15).

The photodetectors (12), (13), (14) and (15) convert the light into electrical signals. The electrical signals are digitised and then the relative optical phase modulation along the reference fibre (30) and the sensing fibre (32) is computed using a fast processor unit (34). The processor unit is time synchronised with the pulse signal (22). The path length difference between path (5) and path (6) defines the spatial resolution.

Methods for calculating the relative phase and amplitude from three phase shifted components of an interference signal are known from the literature. For example, Zhigiang Zhao et al. ("Improved Demodulation Scheme for Fiber Optic Interferometers Using an Asymmetric 3×3 Coupler", J. Lightwave Technology, Vol. 13, No. 11, November 1997, pp. 2059-2068) and Huang at al (U.S. Pat. No. 5,946,429) describe techniques for demodulating the outputs of 3×3 couplers in continuous wave multiplexing applications.

The phase angle data is sensitive to acoustic perturbations experienced by the sensing fibre. As an acoustic wave passes through the optical fibre, it causes the glass structure to contract and expand. This varies the optical path length between the backscattered light reflected from two locations in the fibre (i.e. the light propagating down the two paths in the interferometer), which is measured in the interferometer as a relative phase change. In this way, the optical phase angle data can be processed to measure the acoustic signal at the point at which the light is reflected.

Figure 3:
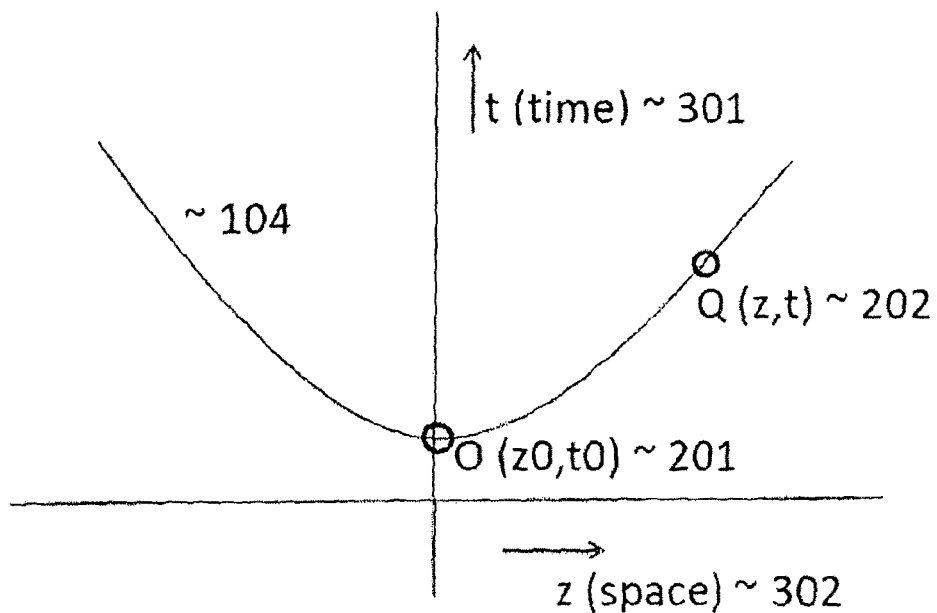
FIG. 3 shows a locus created by positions of detection of an acoustic source by a detector means.

With reference to FIG. 3, the processing means (103) may consist of manual sketching of loci (104) on a graphical plot of intensity with time axis (301) and spatial axis (302) which may be useful for rapid assessment of particular acoustic behaviour of an acoustic source (100). However, in a preferred embodiment of the invention, processing means (103) may be implemented by means of a computer and computer programmes executing mathematical algorithms.

The processing means (105) used to obtain the distance of an acoustic source (100) from the detection means (101) is now described with reference to the preferred embodiment described above in which the detection means consists of a plurality of acoustic sensors aligned in a straight line over a distance approximately commensurate with the expected distance from the source.

Figure 2:
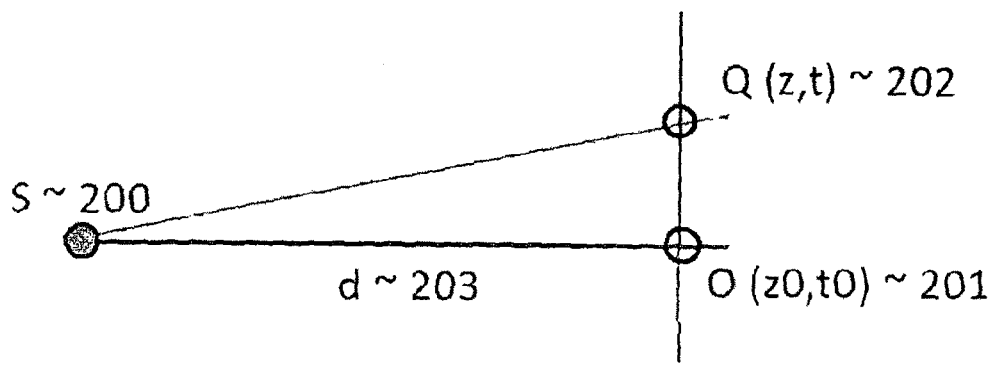
FIG. 2 shows the relationship of an acoustic source and positions of detection at a detector means.

With reference to FIG. 2, an acoustic source S (200) is located at orthogonal distance d (203) from the point O (201) designated as position z0. An acoustic wave travelling at uniform velocity and leaving S (200) at time is will reach O (201) at time t0 before reaching any other part of the detector means at time t, such as Q (202) at position z. If the average velocity of propagation of the acoustic energy is represented by v, then the following:

$$v^2(t-ts)^2=(z-z0)^2+d^2 \qquad \text{(expression 1)}$$

may be obtained by invoking the theorem of Pythagoras and relates the position and time at which any particular point of a spherical acoustic wave emanating from acoustic source S (200) reaches any particular point O (202) relative to the point of first detection O (201). However, the time taken for the acoustic energy to reach the point of first detection O (201) is given by the following:

$$d=(t0-ts)v \qquad \text{(expression 2)}$$

And so, combining expressions 1 and 2 leads to the following:

$$(z-z0)^2=v^2(t-t0)^2+2dv(t-t0) \qquad \text{(expression 3)}$$

Although in particular circumstances it may be possible to determine the values of z0 and t0 or ts independently, it will be usual that z0 and t0 at O (201) or ts at S (200), along with the distance d (203) and the velocity v are to be treated as unknowns to be obtained by processing means (105). The loci (104) consist of co-ordinate pairs (z,t) and so using well-known mathematical techniques, such as least squares curve fitting, a person skilled in the art of signal processing may derive best estimates for the unknowns in expression 1 or expression 3, realising the value of the distance d (203), which is a preferred aim of the present invention. Expression 1 and expression 3 rely on the assumption that the velocity of propagation of the acoustic energy is a constant and so any deviation between the result of expression 1 or expression 3 and the measured loci (104) may be an indication of the variation in the average velocity between different parts of the loci (104) and the acoustic source (100). If the average velocity in the vicinity of the detection means is known, perhaps from previous measurements, then a comparison between the value obtained by processing means (105) from expression 1 or expression 3 and that previously known provides a check on the quality of the value of d obtained at the same time from expression 1 or expression 3. Small differences in the values of v so obtained would give confidence in the value of d whereas large differences in the average velocity would imply unexpected behaviour and hence cast doubt on the value of d obtained.

The inventors have observed that under some conditions in practice, the acoustic energy reaching the acoustic detection means (101) may have a different shape when detected at Q (202) where the values of z is greater than z0 compared with when detected where z is less than z0. The difference in shape may be sufficiently great to permit using the point of difference at which the change takes place as the point of earliest impact O (201) thereby obtaining values for t0 and z0. In addition, the average velocity of sound v between the detection means (101) and the acoustic source (100) may be known either from knowledge of the material, or more accurately, by prior measurement. Substituting expression 2 into expression 1 gives the following:

$$v^2(t-t0+d/v)^2=(z-z0)^2+d^2 \qquad \text{(expression 4)}$$

Thus, with t0, z0, and v known, expression 4 gives an estimate of d for each measurement of the distance z at the time t on the locus (104). In this case, the processing means to derive the loci (103) and the processing means to derive the position of the acoustic source (105) may be combined advantageously as is now explained.

Expression 4 may be re-arranged to give the following:

$$\tau(z) = t - t0 = \sqrt{\frac{(z-z0)^2 + d^2}{v^2}} - \frac{d}{v} \qquad \text{(expression 5)}$$

where τ(z) is the delay between a point on the acoustic signal reaching the point of first impact O (201) and position Q (202). The signal (102) obtained from the detection means (101) may be represented as a two dimensional matrix of samples A[i,j] where the rows (index i) contain the samples in space (z[i]) as the first dimension and the columns (index j) contain the samples in time (t[j]) as the second dimension. A second two dimensional matrix of samples B[i,j,k] may be obtained from A[i,j] by shifting each row by the appropriate amount obtained from the time delay given by the appropriate value of z[i] substituted into expression 5 together with an estimated value of d[k]. By deriving a set of matrices B for a range of estimated values of d[k], a correlation or cost function may be defined in the space dimension as the following:

$$c[k]=\Sigma_j(\rho_i B[i,j,k])^2/\Sigma_j\Sigma_i B[i,j,k]^2 \qquad \text{(expression 6)}$$

which takes the value of one if for each value of j the B[i,j,k] are equal for all i, and takes a value of less than one for non-equality. Since the shape of the detected acoustic energy is assumed to be substantially the same, the value of C[k] that is a maximum indicates the value of d[k] that is most likely, that is, best describes the measured pattern of the acoustic energy received by the detector means (101). In those circumstances where the shape of the acoustic energy differs for z>z0 and z<z0, it will be necessary to evaluate expression 6 separately for each of the two spatial regions z>z0 and z<z0, and then the resultant two values for the most likely value of d (203) may be combined to give a single optimum value using a weighted average where the weights are the peak values of the cost function C[k] for each region.

A further, multi-channel, embodiment will now be described, that builds upon the above described multi-spectral time of arrival embodiment. In the further embodiment multiple frequencies from an incident acoustic wave on the fibre detector can be separated (e.g. using a fast fourier transform (FFT)) and processed separately to determine localisation of the source. This provides additional advantages over the multi-spectral time of arrival approach described above in that it allows the acoustic transmission properties of the earth on acoustic surface waves to be taken into account. In this respect, the earth acts as a distance dependent filter to surface acoustic waves, attenuating different frequencies to different extents depending on the distance from the source to the detector. Therefore, using the time of arrival approach described above requires very careful calibration, to determine for each possible target source distance the overall velocity of sound through the earth from that target source to the detector array. The present multi-channel embodiment addresses the need for such careful calibration, by instead separating the incident sound into its component frequencies, and then using frequencies the velocity for which is known from a priori dispersion measurements of the site.

Figure 10:
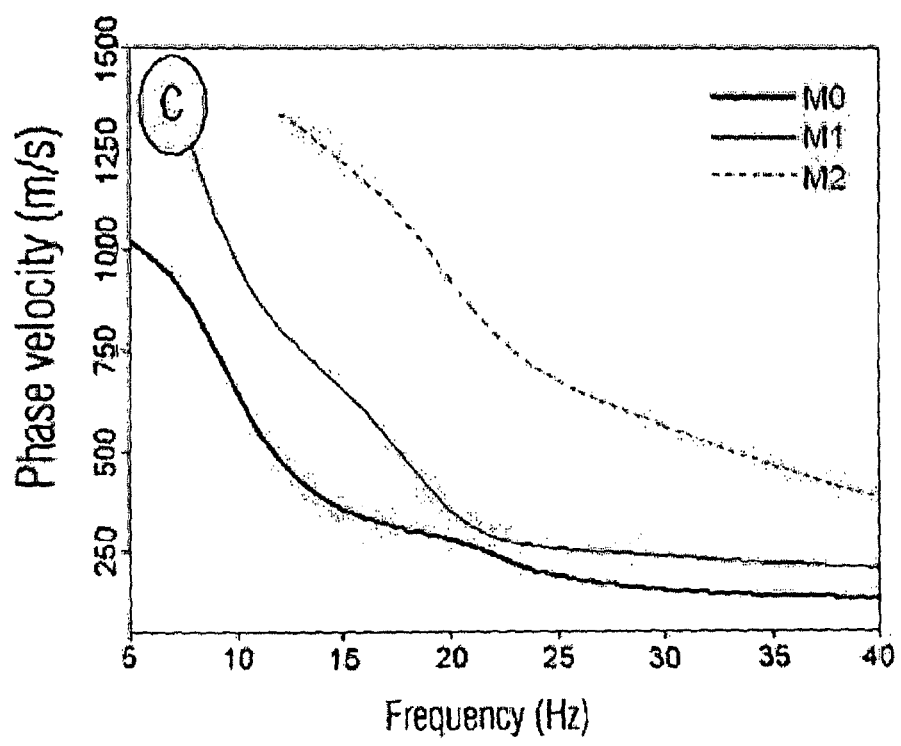
FIG. 10 is an example dispersion curve from the prior art.

More particularly, in security applications, a distributed optical fibre acoustic sensor would typically be buried about one meter below ground. In similar setups, when a compressional wave source is used, more than two thirds of the total energy emitted is conveyed into Rayleigh waves. Each frequency component of the surface wave has a different propagation velocity. This property is called dispersion. Dispersion curves can be extracted by analysing the data recorded by an array of conventional geophones (see FIG. 10, taken from Park C B, Miller R D, Xia J (1999). *Multichannel analysis of surface Waves (Masw)*; Geophys., 64: 800-8.)

Figure 11:
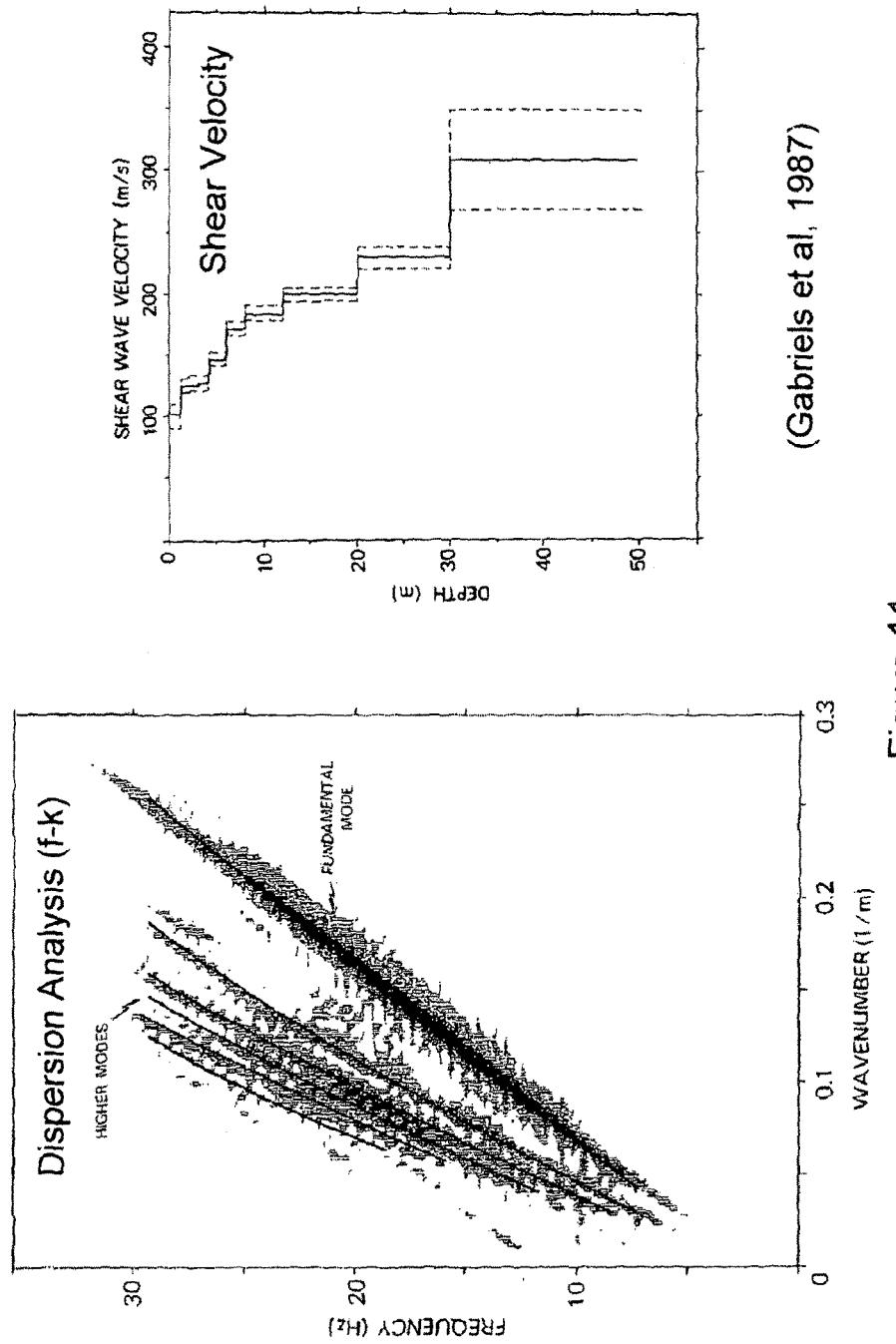
FIG. 11 is an example dispersion analysis and shear wave profile of the prior art.

FIG. 11 (taken from Gabriels, P., Snider, R., and Nolet, G., 1987, *In situ measurements of shear-wave velocity in sediments with higher-mode Rayleigh waves*: Geophys. Prospecting, 35, 187-196) shows an example of the first documented multichannel approach for surface-wave analysis that goes back to the 1980s, when investigators in The Netherlands used a 24-channel acquisition system to deduce shear-wave velocity structure of tidal flats by analyzing recorded surface waves.

In order to use multi channel analysis to localise a source, first obtain the two dimensional matrix of samples ADA, as described previously. That is, the signal (102) obtained from the detection means (101) may be represented as the two dimensional matrix of samples A[i,j] where the rows (index i) contain the samples in space (z[i]) as the first dimension and the columns (index j) contain the samples in time (t[j]) as the second dimension. Then, a third two dimensional matrix of samples G[i,n,k] may be obtained from A[i,j] by obtaining the frequency spectrum of the temporal dimension (e.g. using FFT) and phase shifting each row n by multiplying it by $e^{j2\pi f_n \tau}$ where $f_n$ is the frequency dictated by the raw index n and τ is the appropriate amount obtained from the time delay given by the appropriate value of z[i] substituted into expression 5 together with an estimated value of d[k] and the speed of sound at that frequency. In this respect, the speed of sound at a particular frequency is obtained from an a priori dispersion analysis of the installation site to obtain the appropriate dispersion curve relating to the geographic location which is being monitored. Having performed the above, the same cost function as described previously in expression 6 can then be used to estimate the source location as:

$$C[k] = \frac{\Sigma_i(\Sigma_m G[i, n, k])^2}{\Sigma_i \Sigma_n G[i, n, k]^2} \quad \text{(Expression 6-2)}$$

Again, as previously, the value of C[k] that is a maximum indicates the value of d[k] that is most likely, that is, best describes the measured pattern of the acoustic energy received by the detector means (101). In those circumstances where the shape of the acoustic energy differs for z>z0 and z<z0, it will be necessary to evaluate expression 6-2 separately for each of the two spatial regions z>z0 and z<z0, and then the resultant two values for the most likely value of d (203) may be combined to give a single optimum value using a weighted average where the weights are the peak values of the cost function C[k] for each region.

Regarding obtaining the a priori dispersion curves, note that the described apparatus of the present embodiments is appropriate for dispersion analysis applications. The dispersion analysis can be used to infer dynamic engineering elastic properties of the near surface earth and can be used in many geotechnical studies. In other words, the same apparatus described can be used to extract the dispersion curves in different sites of interest. The shear velocity profile of the layers in the site can then be constructed by analysing the dispersive properties of the surface waves. This can provide ground stiffness in 1-D, 2-D, and 3-D formats for various types of geotechnical engineering projects.

So far this description describes finding the distance between a single source and the detection means but it is understood that there may be independent detection means and that the results obtained may be combined to give enhanced information about the position of a source. For example in a security application, there may be an ambiguity in which side of a single detection means an acoustic source is located on the surface of the ground under which the detection means may be buried. In many cases, this ambiguity would be resolved by independent information relevant to the installation, such as known barriers or other features that distinguish the two sides of the detector means.

Figure 4:
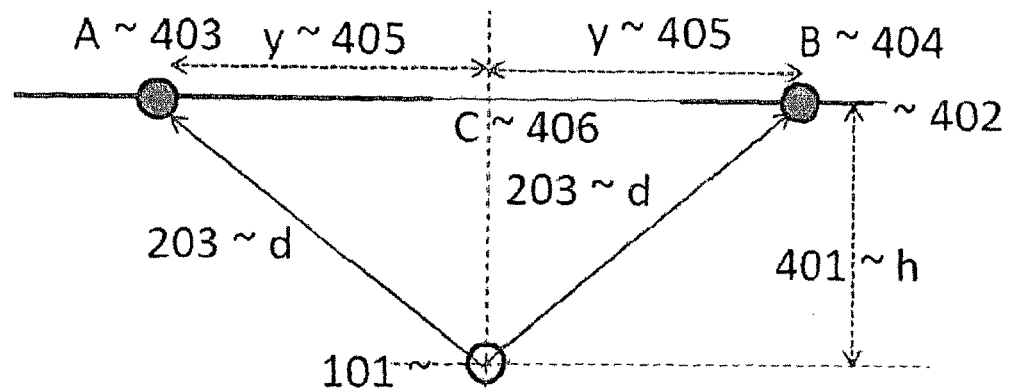
FIG. 4 shows a cross-sectional view of an acoustic source on a ground surface and a detection means buried beneath the surface.

The provision of two detector means at a known separation may be used to resolve this ambiguity by combining the estimates of the distance between the source and detector means. With reference to FIG. 4, the detector means (101) is showed buried distance h (401) below a surface (402) of a ground and thus the detection of an acoustic source at a distance d (203) implies that the acoustic source S (200) lies on the surface (402) at either position A (403) or B (404) at a distance y (405) from a point C (406) on the surface (402) vertically above the detection means (101). The value of y is given by:

$$y = \pm\sqrt{d^2 - h^2} \quad \text{(expression 7)}$$

Figure 5:
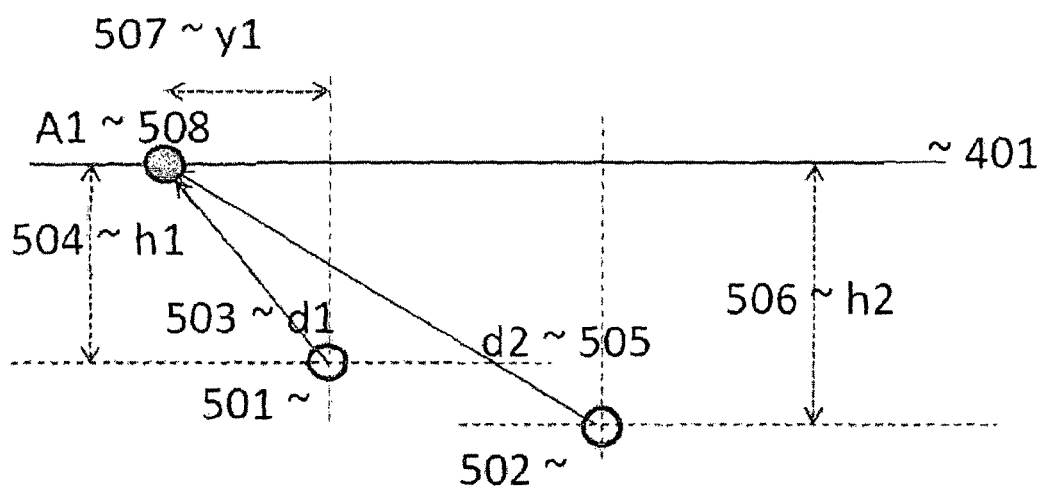
FIG. 5 shows a cross-sectional view of an acoustic source on a ground surface and two detection means buried beneath the surface.

With reference to FIG. 5, one way of resolving the ambiguity in position, when there is one detection means (101) as shown in FIG. 4, is to provide two detection means (501) and (502) buried beneath the surface (401). Solving expression 7 for the values of d1 (503), h1 (504), d2 (505) and h2 (506) leads to a single value of y1 (507) so locating the source at a single position A1 (508) on the surface (401).

Figure 6:
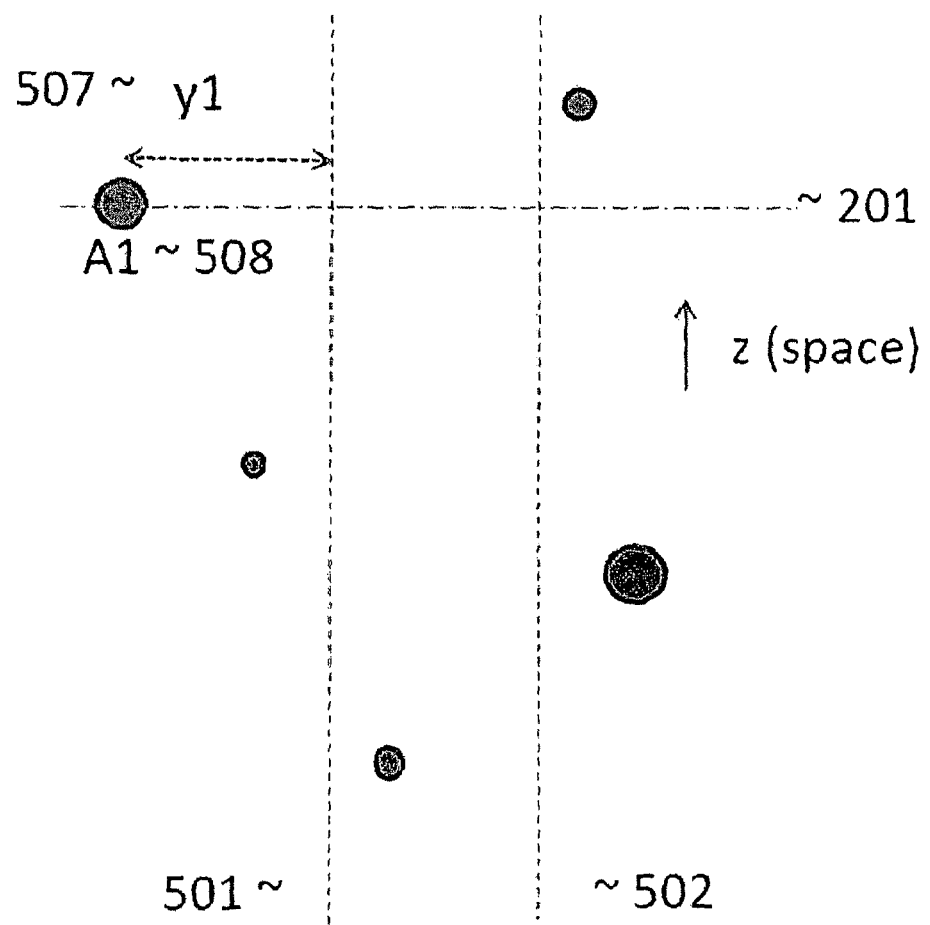
FIG. 6 shows a surface map of an acoustic source on a ground surface and two detection means buried beneath the surface.

With reference to FIG. 6 which shows a surface map viewed from above, for example, the results of locating sources on a surface with the detection means (501) and (502) and buried beneath a surface of a ground may be displayed as a map with the position of each source A1 (508) determined from the value y1 (507) and position z0 (201) along the detection means (501) for that source.

Figure 7:
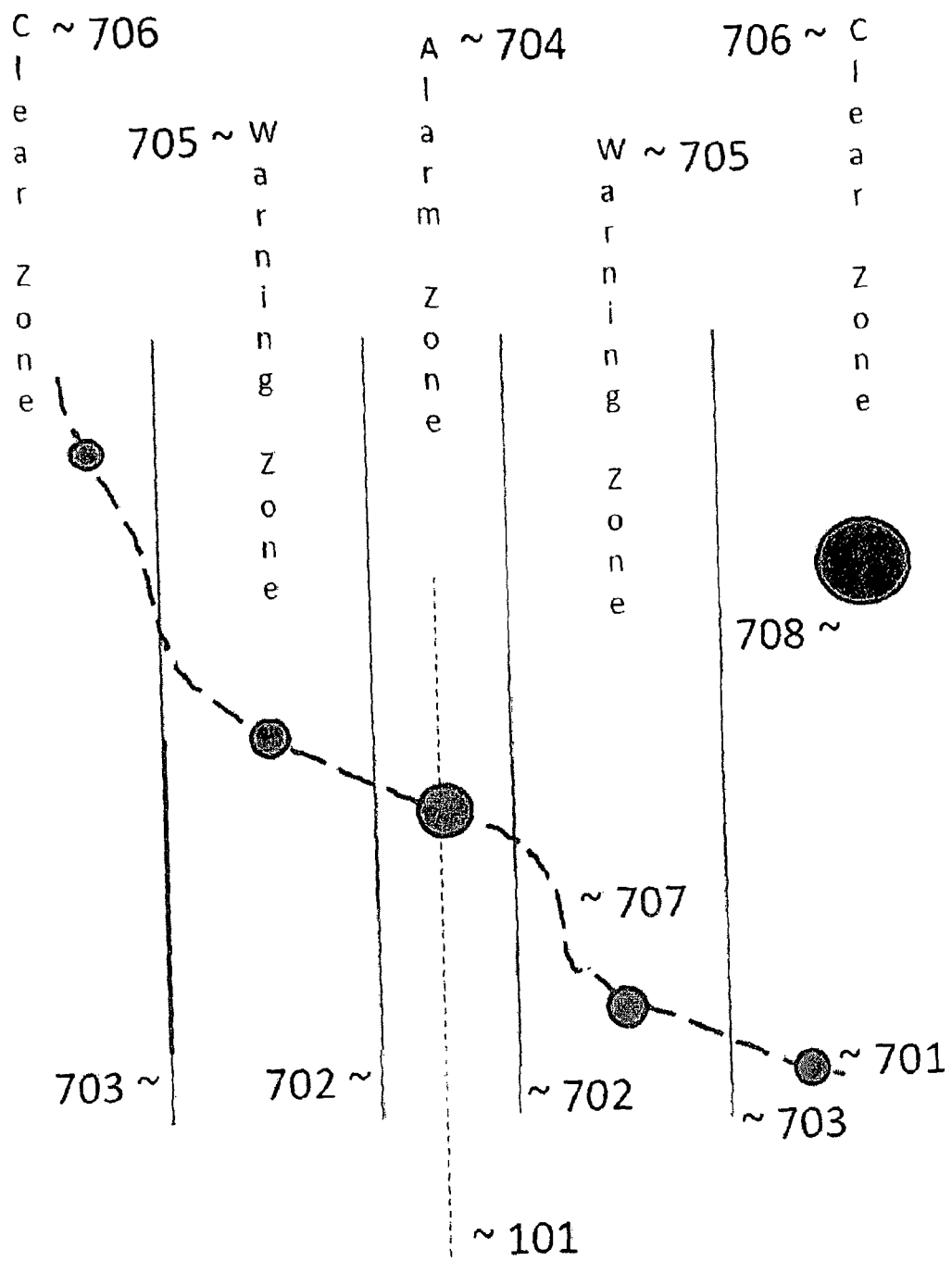
FIG. 7 shows a surface map of an acoustic source on a ground surface and a detection means buried beneath the surface, including different surface zones.

With reference to FIG. 7 which shows a surface map including zones, in addition, to locating the source spatially on the map, it is informative to display either a size or a colour of the indication of the position of the source (701) as a means of displaying an intensity of the acoustic energy of the source (701). Such an indication, for example, may arise from a person walking across the surface of the ground under which the detection means (101) is buried. In many applications, for example, it is useful also to delineate zones by boundaries such as inner (702) and outer (703). Thus a zone within the inner boundary (702) could be designated an alarm zone (704), zones between inner (702) and outer (703) boundaries could be designated a warning zone (705), and zones outside the outer (703) boundary could be designated a clear zone.

A map exemplified by FIG. 7 is useful in giving a rapid assessment of the position of an acoustic source particularly using colour- and size-coded symbols. For example, a sound source (701) following a trajectory (707) on the ground surface could be seen, for example, to pass from a clear zone, perhaps coded in green for display, into a warning zone, perhaps coded in orange for display, through an alarm zone, perhaps coded in red, a warning zone, and into a clear zone. The size or shape of the symbol identifying the location could encode the estimated intensity of the acoustic source, for example, by using a person walking symbol for lower intensity sources, a person digging symbol for medium intensity sources, and an excavator symbol for high intensity sources. FIG. 7 also demonstrates the usefulness of being able to locate an acoustic source on a surface as provided by the present invention without using knowledge of the relative intensities of the acoustic sources. Thus, with reference to FIG. 7, acoustic source (708) is shown located in a clear zone but may have a much larger intensity than sources much closer to the detection means (101) but could be disregarded because of its position.

Embodiments of the present invention have been described with respect to detection means which is aligned substantially along a straight line, which is advantageous for applications that relate to detection over many tens of kilometers. In this form, the location along the detection means (101) and the longitudinal position in space are one and the same parameter which simplifies the processing provided by processing means (105). However, there are advantages in installing the detection means in different layouts to that of a straight line, but then the processing means (105) also provides the relationship between the position along the fibre and the position in space so that the loci (104) may be converted to a spatial position of an acoustic source.

Figure 8:
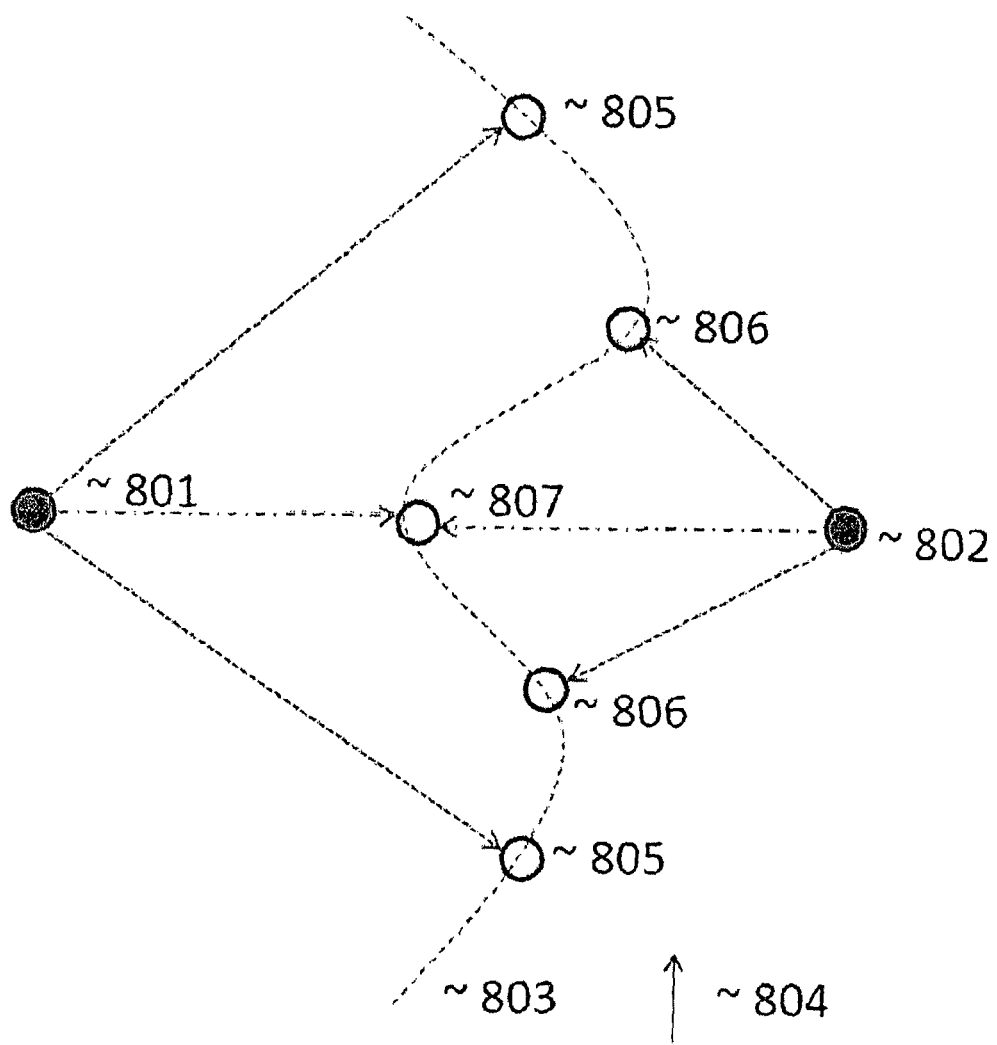
FIG. 8 shows a surface map in which the detection means is not aligned along a straight line.

With reference to FIG. 8, acoustic sources (801) and (802) are shown on a surface of a ground under which detection means (803) is buried and aligned in a quasi-repetitive curve, and preferably, in a periodic curve, along a spatial axis (804). In this case the ambiguity shown in FIG. 4 of the position of the source (200) is resolved by the difference in the loci, for example, obtained from source (801) and (802) on different sides of the detector means at positions (805) for source (801) and positions (806) for source (802) and common position (807) for both sources (801, 802).

Figure 9:
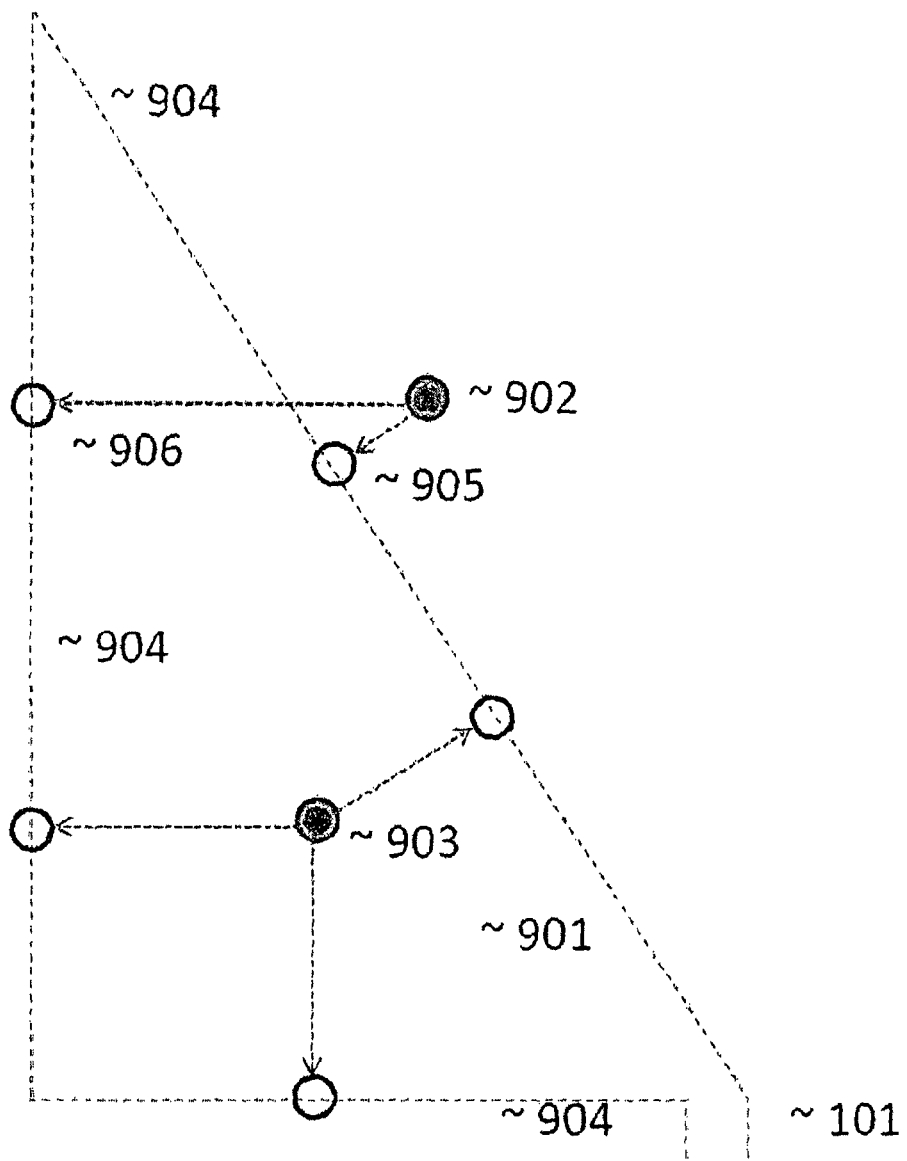
FIG. 9 shows a surface map in which the detection means encloses a region.

With reference to FIG. 9, the detection means (101) is shown as enclosing a region of interest (901) such that acoustic energy from a single source (902) or (903) may be detected by different sections (904) of the detection means (101) and so the information on the distance from the detecting means (101) provided by processing means (105) from the different sections (904) may be combined to enhance a localisation of the source and or signal to noise performance enhancing the likelihood of detection.

With layouts of the detection means (101) exemplified in FIGS. 8 and 9, processing means (105) provides additional filtering and other known techniques familiar to a person skilled in the art of signal processing for the purposes of distinguishing between different sources, for example, (902) and (903), and the same source detected at distinct and separate positions, for example, (905) and (906), along the detection means (101). A wide variety of layout of the detection means (101) may be used where the choice will mainly be determined by the location and purpose of the application and the present invention is understood to incorporate this variety including the provision of a plurality of detection means used either independently or in combination. The dimensions of any layout of the detection means and any depth of burial are understood to depend upon context of use, such as size and nature of region of interest and range of intensity of acoustic source required to be detected.

In the present application an acoustic sensor refers to a means of converting acoustic energy into a signal as a function of time at a single location in space at which the sensor is located, a distributed acoustic sensor refers to a plurality of acoustic sensors located at adjacent positions in space to form a continuum in space, and a distributed optical fibre acoustic sensor refers to a distributed acoustic sensor realised by an optical fibre (such as described in relation to FIG. 1b). One particular advantage of a distributed sensor is that it is equivalent to a very large number of point sensors distributed over great distances. Typical distributed optical fibre sensors extend to 10 kilometers with 1 meter resolution thus realising the equivalent of 10,000 point sensors.

Accordingly, it is desirable to combine the advantages of a distributed optical fibre sensor and acoustic sensors providing acoustic amplitude and phase.

This description mainly describes examples of detection in two dimensions but it is understood that a surface need not be planar, a surface is not required, and that location may be achieved in three dimensions. In particular, the optical fibre sensor cable may extend in a planar manner on the surface or located subsurface, and may also extend outside the general plane of deployment, into three dimensions. For example, for seismic or micro-seismic monitoring a sensor deployment may extend on the surface and within a subsurface wellbore, to enable multi-directional localisation.

In addition, the cable structure may be enhanced to improve localisation, by adapting the cable casing and inner sleeves to permit acoustic wave conduction to the sensor fibre within.

As stated above, there are several industrial applications where knowing the distance to an acoustic source is advantageous. One such application is in the fracturing of oil or gas-bearing shale by injecting water and chemicals under high pressure. As the shale fractures acoustic energy is released in a narrow region of space and may therefore be considered to be a point source. The overall progress and extent of the fracturing can be monitored by measuring the distribution of position and intensity of these point sources.

As mentioned in the background section, the strength of an acoustic source is usually unknown and so the strength of a signal as detected by an acoustic sensor is not a reliable indicator of the distance between the source and the sensor. However, as the present invention provides an independent means of obtaining the distance between the source and the sensor, then the strength of acoustic energy detected can be used as a measure of the strength of the source assuming that an average attenuation propagation coefficient is known for the medium between the source and the sensor.

In prior art, the acoustic sensor is in the form of an acoustic array consisting of a plurality of acoustic point detectors, such as, hydrophones or geophones, commonly termed 'passive seismic' or 'micro seismic' detection. Typically, these sensor arrays are deployed either in linear form inserted into a borehole within a few hundred meters of the point of injection of fracturing fluids, or in the form of a two dimensional grid on or just below the surface adjacent to the injection point. A limitation of this prior art is that the number of sensors that may be deployed is limited at typically less than one hundred, and their spatial locations are either constant or may only be changed by laborious and time-consuming re-deployment of the sensor array. A distributed optical fibre sensor of acoustic amplitude and phase, such as disclosed herein, provides the equivalent of many thousands of point acoustic sensors and which may be deployed in a wide variety of geometric configurations, overcomes this limitation of the prior art as well as providing advantageously high acoustic frequency capability at over 5 kHz.

Another important application is for security such as detecting intruders breaching a perimeter fence or in pipeline surveillance for detection of potential saboteurs or illegal tapping of oil and gas pipelines. In this application, which may extend for tens of kilometers of region to be secured, a distributed sensor has clear advantages which the present invention seeks to exploit. A distributed optical fibre acoustic sensor would typically be buried about one meter below ground and extend for many tens of kilometers with a spatial resolution of the order of one meter realising detailed monitoring of the extended distance.

The present invention teaches a method of obtaining the distance from the distributed sensor which may be projected onto the ground surface under which the sensor is buried, thereby creating a map on which an acoustic source may be located when detected, for example, a person walking near the sensor. Since, in general, not all sources need to be detected, it is advantageous to be able to use the distance of the source from the distributed detector as a means of discriminating between acoustic sources to be ignored and those that indicate action is required, such as the deployment of security personnel to investigate. The discrimination may be easily portrayed as different zones on a spatial map, such as that provided by the UK Ordnance Survey™ or satellite pictures available from Google Maps™, and identification of the significance of detected sources could be indicated by a variety of means such as colour coded variably sized symbols. In addition the coordinates of the distributed sensor and/or a localised acoustic source may be referenced to a global positioning system (GPS).

This description often refers to the location of a single acoustic source but it is understood that the present invention is not restricted to the detection of a single source and is capable of detecting a plurality of sources at different times and positions only limited by the spatial and time resolutions of the detecting means, and the signal amplitudes available from the acoustic sources.

Furthermore, while the invention has been exemplified by describing a distributed optical fibre sensor with an associated interferometer arrangement (to provide high spatial resolution) it will be readily understood that the invention can be realised using distributed optical fibre sensors employing coherent Rayleigh noise methodologies, or indeed a plurality of synchronised point sensors. The skilled person will be readily able to apply the present invention to these alternative detection schemes.

A person skilled in the art of signal processing will know how and when to apply a variety of common signal processing procedures, such as Fourier transforms, filtering and averaging, to achieve and improve performance of the present invention and these are understood thereby to be incorporated herein.

Various modifications may be made within the scope of the invention as herein intended, and embodiments of the invention may include combinations of features other than those expressly claimed.

The invention claimed is:

1. A method of determining a location of an acoustic source, the method comprising:
   providing a distributed optical fibre sensor in an area to be monitored, the distributed optical fibre sensor being deployed in a known location;
   receiving an acoustic signal from the acoustic source at a plurality of sensing regions spatially distributed along a length of the distributed optical fibre sensor such that the acoustic signal is received at the respective sensing regions at different respective times to thereby obtain a first two dimensional spatiotemporal data set; and
   processing the received acoustic signals to determine the location of the acoustic source relative to at least one sensing region along the length of the distributed optical fibre sensor;
   wherein the processing the received acoustic signals comprises evaluating a plurality of cost functions for one or more of the received acoustic signals, wherein evaluating one of the plurality of cost functions comprises:
      time shifting the first spatiotemporal data set in dependence on positions of the sensing regions along the length of the distributed optical fibre sensor at which the acoustic signal is received and an estimate value for a shortest distance between the acoustic source and the distributed optical fibre sensor to obtain a time-delayed two dimensional spatiotemporal data set; and
      calculating the cost function based on the time-delayed spatiotemporal data set;
   wherein the processing further comprises selecting a maximum cost function from the plurality of cost functions, the estimate value used to calculate the maximum cost function being an actual shortest distance between the acoustic source and the distributed optical fibre sensor.

2. The method according to claim 1, wherein the distributed optical fibre sensor comprises an interferometer configured to determine optical phase angle data corresponding to the acoustic signal.

3. The method according to claim 1, wherein the distributed optical fibre sensor employs coherent Rayleigh noise methods to measure the acoustic signal.

4. A method of monitoring a hydraulic fracturing process comprising the method of claim 1, and further comprising:
   i) deploying a distributed optical fibre sensor in the vicinity of oil- or gas-bearing shale to be fractured by the hydraulic fracturing process; and
   ii) injecting water and/or chemicals into the oil- or gas-bearing shale and determining the location of at least one resulting acoustic event.

5. A surveillance method comprising the method of claim 1, comprising deploying a distributed optical fibre sensor in the vicinity of an asset or location to be monitored; wherein the distributed optical fibre sensor is optionally deployed on or along the asset, or around the location.

6. A method of determining a location of an acoustic source, the method comprising:
   providing a distributed optical fibre sensor in an area to be monitored, the distributed optical fibre sensor being deployed in a known location;
   receiving an acoustic signal from the acoustic source at a plurality of sensing regions spatially distributed along a length of the distributed optical fibre sensor such that the acoustic signal is received at the respective sensing regions at different respective times to thereby obtain a first two dimensional spatiotemporal data set; and
   processing the received acoustic signals to determine the location of the acoustic source relative to at least one sensing region along the length of the distributed optical fibre sensor,
   wherein processing the received acoustic signals comprises separating an acoustic signal received at the plurality of sensing regions into its component frequencies and evaluating a plurality of cost functions for one or more of the received acoustic signals, wherein evaluating one of the plurality of cost functions comprises:
      phase shifting the first spatiotemporal data set in dependence on an estimate value of the shortest distance between the acoustic source and the distributed optical fibre, one or more of the component frequencies and a known speed of sound for the one or more component frequencies through the surrounding medium to obtain one or more phase-shifted two dimensional spatiotemporal data sets; and
      calculating the cost function based on the phase shifted spatiotemporal data set,
   wherein the processing further comprises selecting a maximum cost function from the plurality of cost functions, the estimate value used to calculate the maximum cost function being the actual shortest distance between the acoustic source and the distributed optical fibre sensor.

7. The method according to claim 6, wherein the distributed optical fibre sensor comprises an interferometer configured to determine optical phase angle data corresponding to the acoustic signal.

8. The method according to claim 6, wherein the distributed optical fibre sensor employs coherent Rayleigh noise methods to measure the acoustic signal.

9. A method of monitoring a hydraulic fracturing process comprising the method of claim 6, and further comprising:
   i) deploying a distributed optical fibre sensor in the vicinity of oil- or gas-bearing shale to be fractured by the hydraulic fracturing process; and
   ii) injecting water and/or chemicals into the oil- or gas-bearing shale and determining the location of at least one resulting acoustic event.

10. A surveillance method comprising the method of claim 6, comprising deploying a distributed optical fibre sensor in the vicinity of an asset or location to be monitored, wherein the distributed optical fibre sensor is optionally deployed on or along the asset, or around the location.

11. The surveillance method of claim 10, wherein the method comprises correlating the determined position of an acoustic source with one or more position related data, wherein the position of the acoustic source is overlaid on a corresponding map of an area being monitored.

12. The surveillance method of claim 10, comprising determining the nature of the acoustic source as a function of the duration of a corresponding acoustic event, the frequency of the acoustic signal, and/or the amplitude of the acoustic event.

13. The surveillance method of claim 10, comprising determining the spatial relationship between the source and an asset to be protected based on the measured position of the acoustic source with respect to the acoustic sensor and producing an alarm or alert responsive to the determined spatial relationship.

14. An apparatus for locating an acoustic source, the apparatus comprising:
a distributed optical fibre sensor deployed in an area to be monitored and arranged to receive an acoustic signal from the acoustic source at a plurality of sensing regions spatially distributed along its length such that the acoustic signal is received at the respective sensing regions at different respective times to thereby obtain a first two dimensional spatiotemporal data set; and
processing means configured to process the received acoustic signals to determine the location of the acoustic source relative to at least one of the sensing regions along the length of the distributed optical fibre sensor;
wherein the processing means is further arranged to evaluate a plurality of cost functions for one or more of the received acoustic signals, wherein evaluating one of the plurality of cost functions comprises:
time shifting the first spatiotemporal data set in dependence on positions of the sensing regions along the length of the distributed optical fibre sensor at which the acoustic signal is received and an estimate value for a shortest distance between the acoustic source and the distributed optical fibre sensor to obtain a time-delayed two dimensional spatiotemporal data set; and
calculating the cost function based on the time-delayed spatiotemporal data sets;
wherein the processing means is further arranged to select a maximum cost function from the plurality, the estimate value used to calculate the maximum cost function being an actual shortest distance between the acoustic source and the distributed optical fibre sensor.

15. A downhole monitoring apparatus comprising the apparatus of claim 14, the distributed optical fibre sensor being deployed in the vicinity of oil- or gas-bearing shale to be fractured by a hydraulic fracturing process.

16. A surveillance apparatus comprising the apparatus of claim 14, the at least one distributed optical fibre sensor being deployed in the vicinity of an asset or location to be monitored.

17. An apparatus for locating an acoustic source, the apparatus comprising:
a distributed optical fibre sensor deployed in an area to be monitored and arranged to receive an acoustic signal from the acoustic source at a plurality of sensing regions spatially distributed along its length such that the acoustic signal is received at the respective sensing regions at different respective times to thereby obtain a first two dimensional spatiotemporal data set; and
processing means configured to process the received acoustic signals to determine the location of the acoustic source relative to at least one of the sensing regions along the length of the distributed optical fibre sensor,
wherein the processing means is further arranged to separate an acoustic signal received at the plurality of sensing regions into its component frequencies and evaluate a plurality of cost functions for one or more of the received acoustic signals, wherein evaluating one of the plurality of cost functions comprises:
phase shifting the first spatiotemporal data set in dependence on an estimate value of the shortest distance between the acoustic source and the distributed optical fibre, one or more of the component frequencies and a known speed of sound for the one or more component frequencies through the surrounding medium to obtain one or more phase shifted two dimensional spatiotemporal data sets; and
calculating the cost function based on the phase shifted spatiotemporal data set,
wherein the processing means is further arranged to select a maximum cost function from the plurality of cost functions, the estimate value used to calculate the maximum cost function being the actual shortest distance between the acoustic source and the distributed optical fibre sensor.

18. A downhole monitoring apparatus comprising the apparatus of claim 17, the distributed optical fibre sensor being deployed in the vicinity of oil- or gas-bearing shale to be fractured by a hydraulic fracturing process.

19. A surveillance apparatus comprising the apparatus of claim 17, the at least one distributed optical fibre sensor being deployed in the vicinity of an asset or location to be monitored.

* * * * *